(12) United States Patent
Alkilde

(10) Patent No.: US 12,378,478 B2
(45) Date of Patent: Aug. 5, 2025

(54) COST EFFECTIVE DEOXYGENATION PROCESS WITH GAS RECYCLE

(71) Applicant: TOPSOE A/S, Kgs. Lyngby (DK)

(72) Inventor: Ole Frej Alkilde, Valby (DK)

(73) Assignee: TOPSOE A/S, Kgs. Lyngby (DK)

(*) Notice: Subject to any disclaimer, the term of this patent is extended or adjusted under 35 U.S.C. 154(b) by 62 days.

(21) Appl. No.: 17/904,881

(22) PCT Filed: Mar. 10, 2021

(86) PCT No.: PCT/EP2021/056088
§ 371 (c)(1),
(2) Date: Aug. 24, 2022

(87) PCT Pub. No.: WO2021/180808
PCT Pub. Date: Sep. 16, 2021

(65) Prior Publication Data
US 2023/0087845 A1    Mar. 23, 2023

(30) Foreign Application Priority Data
Mar. 12, 2020    (EP) .................................... 20162755

(51) Int. Cl.
*C10G 3/00* (2006.01)
*C10G 65/02* (2006.01)

(52) U.S. Cl.
CPC ............... *C10G 3/50* (2013.01); *C10G 3/44* (2013.01); *C10G 65/02* (2013.01); *C10G 2300/1011* (2013.01); *C10G 2300/4081* (2013.01)

(58) Field of Classification Search
CPC ............ C10G 3/44; C10G 3/50; C10G 65/02; C10G 2300/1011; C10G 2300/4081; Y02P 30/20
See application file for complete search history.

(56) References Cited

U.S. PATENT DOCUMENTS 8,507,738 B2    8/2013    Gomes et al.
2010/0043279 A1    2/2010    Abhari et al.
(Continued)

FOREIGN PATENT DOCUMENTS

EA    032846 B1    7/2019
EA    033009 B1    8/2019
(Continued)

OTHER PUBLICATIONS

Wiesser, O. et al., 1973, Sulphide Catalyst, Their Properties and Applications, Pergamon, 504 pp. (Office action cites p. 19). (Year: 1973).*
European Search Report issued in corresponding Patent Application No. EP 20 16 2755 dated Jul. 27, 2020.
(Continued)

*Primary Examiner* — Brian A McCaig
(74) *Attorney, Agent, or Firm* — Boone IP Law

(57) ABSTRACT

The present disclosure relate to a process plant and a method for production of a hydrocarbon mixture from a feedstock stream comprising oxygenates and a make-up hydrogen gas stream, involving directing a feed stream, comprising the feedstock stream comprising oxygenates, the make-up hydrogen gas stream and a hydrogen rich gas stream, to contact a material catalytically active in deoxygenation under active deoxygenation conditions and withdrawing a deoxygenated product stream, characterized in the hydrogen rich gas stream comprising at least 70 vol % hydrogen, at least 0.1 vol % carbon oxides and at least 50 ppm$_{vol}$ H$_2$S, with the associated benefit that such a method, where carbon oxides are allowed to be present may be realized without requiring a step of purifying said recycled hydrogen rich gas stream, e.g. by use of an amine wash.

13 Claims, 2 Drawing Sheets

(56) References Cited

U.S. PATENT DOCUMENTS

| | | |
|---|---|---|
| 2013/0240406 A1 | 9/2013 | Sadler et al. |
| 2016/0108322 A1 | 4/2016 | Bhan |
| 2016/0369184 A1 | 12/2016 | Ward et al. |
| 2017/0009151 A1 | 1/2017 | Dittrich et al. |

FOREIGN PATENT DOCUMENTS

| | | | |
|---|---|---|---|
| RU | 2565048 C1 | 10/2015 | |
| WO | 2010028717 A2 | 3/2010 | |
| WO | 2013/138001 A1 | 9/2013 | |
| WO | WO-2014001632 A1 * | 1/2014 | ............ C10B 53/02 |
| WO | 2014077944 A1 | 5/2014 | |
| WO | 2015/000850 A1 | 1/2015 | |
| WO | 2015/128037 A1 | 9/2015 | |

OTHER PUBLICATIONS

International Search Report (PCT/ISA/210) and Written Opinion (PCT/ISA/237) mailed on Jun. 2, 2021, by the European Patent Office as the International Searching Authority for International Application No. PCT/EP2021/056088.

Donnis et al., "Hydroprocessing of Bio-Oils and Oxygenates to Hydrocarbons. Understanding the Reaction Routes", Top Catal, 2009, pp. 229-240.

Mäki-Arvela et al., "Continuous decarboxylation of lauric and acid Pd/C catalyst", Fuel 87, 2008, pp. 3543-3549.

Official Action issued in Russian Patent Application No. 2022126390/04(057558), Aug. 14, 2024, 8 pages.

Search Report issued in Russian Patent Application No. 2022126390/04(057558), Aug. 14, 2024, 4 pages.

* cited by examiner

COST EFFECTIVE DEOXYGENATION PROCESS WITH GAS RECYCLE

The present invention relates to a method for deoxygenation of oxygenates, such as renewable materials, by deoxygenation in a process employing a recycled gas stream with little or no cleaning of the recycled gas stream.

Deoxygenation of oxygenates, of e.g. renewable origin, has been identified to be an efficient way to provide high quality transportation fuels. As the content of oxygen and other heteroatoms is quite high, deoxygenation requires a large amount of hydrogen, and therefore efficient use of the hydrogen is commercially important. A gas recycle stream is therefore almost always used in such processes.

It is customary to purify the gas being recycled, as the concentration of CO, $CO_2$ and $H_2O$ have been expected to reduce the conversion in the process, and possibly also damage the material catalytically active in deoxygenation. The capital cost and the operational cost of gas purification is significant.

Since the early 1990's processes have been proposed for deoxygenation of oxygenates, especially fatty acids and triglycerides, with the objective of obtaining quality transportation fuels. Such processes are known to involve decarboxylation and decarbonylation side reactions producing carbon oxides, CO and $CO_2$. Maki-Arvela et al in Energy Fuels 2007; 21(1):30-41 identify $CO_2$ and CO as contributing to catalyst deactivation and Donnis et al in Top. Catal. (2009) 52:229-240 recommend an amine wash if hydrogen gas is recycled, which will remove $CO_2$ and $H_2S$. Although these findings were related to specific catalysts they have resulted in a general implementation of purification of recycle gas.

WO2014077944A1 describes a process for hydrotreatment of pyrolysis oil with a recycle gas at the level of block diagrams. The application does not disclose any details on gas composition, including the presence or absence of hydrogen sulfide and carbon oxides or on the separation and purification of the recycled gas.

Applications describing the process with a specific description of a recycle gas describes the gas loop as comprising a means of purification, such as an amine scrubber for removal of hydrogen sulfide and carbon oxides.

It has now been identified that the negative impact of carbon oxides on the deoxygenation process is less than expected, especially if using a catalyst not comprising cobalt, and therefore the provision of a process in which CO and $CO_2$ are present during deoxygenation is related to a significant cost reduction both in terms of investment and in terms of operation.

In the following the term deoxygenation shall be used to signify removal of oxygen from oxygenates by formation of water in the presence of hydrogen (also known as hydrodeoxygenation), as well as removal of oxygen from oxygenates by formation of carbon oxides in the presence of hydrogen (also known as decarboxylation).

In the following the term active deoxygenation conditions shall be used to signify conditions under which at least 10% conversion by deoxygenation shall take place.

In the following where concentrations (typically in liquid or solid phase) are stated in wt % this shall be understood as weight/weight %.

In the following where concentrations in the gas phase are stated, they are, unless otherwise specified given as molar (volumetric) concentration, e.g. vol % or $ppm_{vol}$.

A broad aspect of the present disclosure relate to a method for production of a hydrocarbon mixture from a feedstock stream comprising oxygenates and a make-up hydrogen gas stream, comprising the steps of directing a feed stream, comprising the feedstock stream comprising oxygenates, the make-up hydrogen gas stream and a hydrogen rich gas stream, to contact a material catalytically active in deoxygenation under active deoxygenation conditions and withdrawing a deoxygenated product stream, characterized in the hydrogen rich gas stream comprising at least 70 vol % hydrogen, at least 0.1 vol % carbon oxides and at least 50 $ppm_{vol}$ $H_2S$, with the associated benefit that such a method, where carbon oxides are allowed to be present may be realized without requiring a step of purifying said recycled hydrogen rich gas stream, e.g. by use of an amine wash.

In a further embodiment, the hydrogen rich gas stream comprises at least 0.1% carbon dioxide with the associated benefit that such a method, where carbon oxides are present may be realized without requiring a step of purifying said recycled hydrogen rich gas stream, e.g. by use of an amine wash.

In a further embodiment, the hydrogen rich gas stream comprises at least 0.1% carbon monoxide, with the associated benefit that such a method, where carbon oxides are present may be realized without requiring a step of purifying said recycled hydrogen rich gas stream, e.g. by use of an amine wash.

In a further embodiment, said feedstock stream comprising oxygenates, comprises a fresh feedstock rich in oxygenates and a liquid diluent, said liquid diluent being a further feedstock or a recycled liquid stream, with the associated benefit of providing an amount of diluent, which may collect the released energy of reaction, and which optionally may be a fossil feed which may be obtained at lower cost than the fresh feedstock rich in oxygenates.

In a further embodiment, said liquid diluent comprises less than 0.1 wt % atomic oxygen, with the associated benefit of such a diluent being a heat sink, collecting the heat of reaction from deoxygenation, without contributing with heat of reaction.

In a further embodiment, said liquid diluent comprises an amount of said deoxygenated product stream or said liquid diluent comprises an amount of a product from a process step receiving an amount of said deoxygenated product stream, with the associated benefit of such a diluent being a heat sink of same origin as the feedstock stream comprising oxygenates.

In a further embodiment, said liquid diluent is a stream comprising fossil feedstock, with the associated benefit of such a diluent being available at lower cost than especially diluents originating from oxygenates of biological origin.

In a further embodiment, the amount of sulfur contained in said hydrogen rich gas stream relative to the amount of sulfur in the gas phase of the combined feed stream is at least 40%, 60% or 80%, with the associated benefit of minimizing the requirement of providing an amount of added sulfur to the process.

In a further embodiment, said material catalytically active in deoxygenation comprises molybdenum and/or nickel, on a support of refractory material and comprising less than 0.1 wt % cobalt, with the associated benefit of such a catalytically active material having robust performance in the presence of carbon oxides.

In a further embodiment, at least an amount of said deoxygenated product stream is directed to contact a material catalytically active in hydrocracking and/or hydroisomerization under active hydrocracking and/or hydroisomerization conditions and withdrawing a further treated product stream, with the associated benefit of carrying out such hydrocracking and/or hydroisomerization prior to the separation step being beneficial if the material catalytically active in hydrocracking and/or hydroisomerization comprises sulfided base metals. Further embodiments with such hydrocracking and/or hydroisomerization processes, or other processes, after the separation method are of course also possible.

In a further embodiment, said deoxygenated product stream or said further treated product stream is separated in a gas stream and a liquid stream, and said hydrogen rich gas stream comprises a recycled amount of said gas stream, with the associated benefit that a hydrogen rich gas stream originating from this gas stream reduces the requirement for addition of make-up hydrogen to the process.

In a further embodiment, less than 50 vol %, such as less than 10 vol %, less than 1 vol % or 0 vol %, of the carbon oxides in the recycled amount of said gas stream are removed prior to the recycled amount of said gas stream is directed to contact said material catalytically active in deoxygenation, with the associated benefit of such limited removal of carbon oxides being a reduced cost of operation as well as a reduced size of equipment, and/or the possibility to choose purification methods having a low cost.

In a further embodiment, said carbon oxides are removed from the gas stream by a process involving membrane separation or by withdrawal of a purge stream, with the associated benefit of membrane separation being simpler and cheaper than e.g. amine wash.

In a further embodiment said removal of carbon oxides does not involve scrubbing of the gas stream. This has the associated benefit of avoiding the cost and complications of a scrubbing process, such as an amine wash.

A further aspect of the disclosure relates to a process plant section for conversion of a feedstock stream comprising oxygenates to a hydrocarbon mixture, comprising a deoxygenation reactor having an inlet and an outlet, a separation section having an inlet and a gas outlet, an aqueous phase outlet and a hydrocarbon phase outlet, wherein said deoxygenation reactor inlet is configured for receiving said feedstock and a recycled hydrogen rich gas stream, said separator is configured for receiving a deoxygenated product stream from said deoxygenation reactor outlet, and the separation section gas outlet is configured for providing said recycled hydrogen rich gas stream, characterized in said process plant section not comprising an amine scrubber configured for treating the stream of the separation section gas outlet, with the associated benefit of such a process plant section having a lower cost both in terms of investment and in terms of operation.

The conversion of oxygenates to paraffins is a common process for production of renewable transportation fuel. The feedstock typically comprises one or more oxygenates taken from the group consisting of triglycerides, fatty acids, resin acids, ketones, aldehydes or alcohols where said oxygenates originate from one or more of a biological source, a gasification process, a pyrolysis process, Fischer-Tropsch synthesis, methanol based synthesis or a further synthesis process, with the associated benefit of such a process being a process viable for receiving a wide range of feedstocks, especially of renewable origin, such as originating from plants, algae, animals, fish, vegetable oil refining, other biological sources, domestic waste, industrial organic waste like tall oil or black liquor.

During hydroprocessing, oxygenates are combined with an excess of hydrogen and react in hydrodeoxygenation processes as well as decarboxylation and decarbonylation processes, where water, carbon dioxide and carbon monoxide are released from the oxygenates, and an amount of carbon dioxide is converted to carbon monoxide by the water/gas shift process. Typically, around 10 wt % of the oxygenate feedstock is oxygen, and thus a significant amount of the product stream will be water, carbon dioxide and carbon monoxide. In addition, an amount of light hydrocarbons (especially methane and propane) may also be present in the product stream, depending on the side reactions and the nature of the feedstock.

Since hydrogen is present in excess, it is desirable to recycle the gas, to ensure efficient use of expensive hydrogen. The recycle of hydrogen gas involves separating the gases from the liquid product in a separation section. This is often done in a three phase separator, where gas, polar (aqueous) product and non-polar (hydrocarbon) product phases may be withdrawn separately.

The gas phase may, in addition to hydrogen, comprise carbon dioxide, carbon monoxide, light hydrocarbons and hydrogen sulfide, as well as other constituents. To minimize the risk of catalyst deactivation, the recycle gas is purified typically by amine wash, where carbon dioxide and hydrogen sulfide are collected by absorption in a solution of amines. Such an amine wash process is typically configured for removing more than 90% of carbon dioxide, such that the concentration of carbon dioxide in gas phase of the combined feed stream directed to contact the material catalytically active in deoxygenation is less than 0.05 vol %.

The deoxygenation process, provides a product rich in linear alkanes, having poor cold flow properties, and therefore the deoxygenation process may be combined with a hydroisomerization process, with the aim of improving the cold flow properties, and/or a hydrocracking process.

Typically deoxygenation involves directing the feedstock stream comprising oxygenates to contact a catalytically active material comprising sulfided molybdenum, or possibly tungsten, and/or nickel, supported on a carrier comprising one or more refractory oxides, typically alumina, but possibly silica or titania. The support is typically amorphous. The catalytically active material may comprise further components, such as boron or phosphorous. The conditions are typically a temperature in the interval 250-400° C., a pressure in the interval 30-150 Bar, and a liquid hourly space velocity (LHSV) in the interval 0.1-2. Deoxygenation is typically exothermal, and with the presence of a high amount of oxygen, the process may involve intermediate cooling e.g. by quenching with cold hydrogen, feed or product. The feedstock may preferably contain an amount of sulfur to ensure sulfidation of the metals, in order to maintain their activity. If the feedstock stream comprising oxygenates comprises less than 10, 50 or 100 ppmw sulfur, a sulfide donor, such as dimethyldisulfide (DMDS) may be added to the feed.

Typically, hydroisomerization involves directing an intermediate deoxygenated product stream feedstock to contact a material catalytically active in hydroisomerization. The conditions are typically a temperature in the interval 250-350° C., a pressure in the interval 20-100 Bar, and a liquid hourly space velocity (LHSV) in the interval 0.5-8. Isomerization is substantially thermally neutral and hydrogen is typically not consumed in the isomerization reactor. The active metal on the material catalytically active in isomerization may either be a base metal or a noble metal. If it is a noble metal, the deoxygenated feedstock is typically purified by gas/liquid separation section often involving a stripping process, which typically will use hydrogen as stripping medium, but other stripping media such as steam may also be used, to reduce the content of sulfur to below 1-10 ppm. If the active metal is a base metal, the feed to hydroisomerization may preferably contain an amount of sulfur to ensure sulfidation of the metals, in order to maintain their activity.

Hydrocracking will adjust the cold flow properties as well as the boiling point characteristics of a hydrocarbon mixture. Typically, hydrocracking involves directing an intermediate feedstock to contact a catalytically active material comprising an active metal (either elemental noble metals such as platinum and/or palladium or sulfided base metals such as nickel, cobalt, tungsten and/or molybdenum), an acidic support (typically a molecular sieve showing high cracking activity, and having a topology such as MFI, BEA and FAU) and a refractory support (such as alumina, silica or titania, or combinations thereof). While this is similar to the material catalytically active isomerization the difference is typically the nature of the acidic support, which may be of a different structure (even amorphous silica-alumina) or have a different acidity e.g. due to silica:alumina ratio. The conditions are typically a temperature in the interval 250-400° C., a pressure in the interval 30-150 Bar, and a liquid hourly space velocity (LHSV) in the interval 0.5-8, optionally together with intermediate cooling by quenching with cold hydrogen, feed or product.

It has now been discovered that, especially, when the process employs a catalytically active material not comprising cobalt in substantial amounts, the short and long term negative impact of carbon oxides upon activity of the catalytically active material is very low. Therefore, the traditional step of "sweetening" the recycle gas by an amine wash may be omitted or replaced by a less efficient withdrawal of sour gas, such as purge or membrane separation.

An additional benefit of omitting or reducing recycle gas sweetening is the avoidance or reduction of a need for addition of sulfur in order maintain catalyst activity, since the recycle gas will keep previously added sulfur in the process for an extended time.

The hydrogen rich gas stream is withdrawn as a recycle gas stream either from a gas/liquid separation section between a base metal based deoxygenation reactor and a noble metal based hydroisomerization reactor, or from a gas/liquid separation system downstream the hydroisomerization reactor, if the material catalytically active in hydroisomerization comprises base metals. The process may also comprise one or more other conversion steps, such as hydrocracking or hydrodearomatization, and depending on the sequence of these steps and the catalytically active metals used, the skilled person will be aware of the possible positions for introducing a gas/liquid separator with the purpose of withdrawing a recycle gas stream.

ELEMENTS SHOWN IN THE FIGURES

Figure 1:
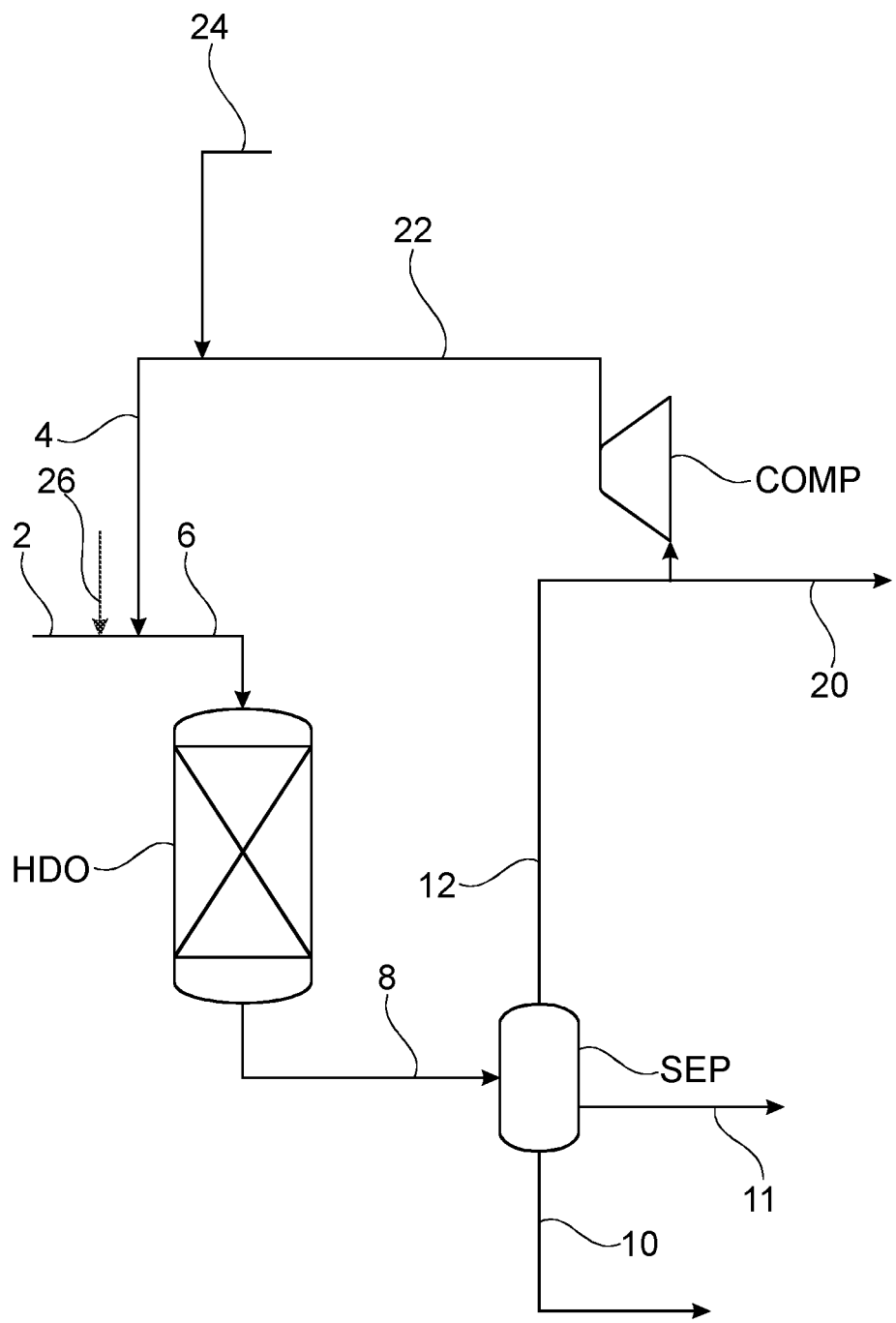
FIG. 1 shows a process layout according to the present disclosure.

2 Feedstock stream comprising oxygenates
4 Hydrogen rich gas
6 Combined feed stream
8 Deoxygenated product stream
10 Aqueous liquid stream
11 Hydrocarbon liquid stream
12 Gas stream
14 Lean amine solution
16 Rich amine solution
18 Purified gas stream
20 Purge gas stream
22 Hydrogen rich recycle gas stream
24 Make-up hydrogen stream
26 Sulfide source
HDO Deoxygenation reactor
SEP Separation section
COMP Recycle compressor
ABS Amine absorber In FIG. 1, a process with recycle of gas, with a purge, and no other intermediate removal of carbon oxides is shown. Here a feedstock stream comprising oxygenates (2) is combined with a hydrogen rich gas stream (4), and directed as a combined feed stream (6) to a deoxygenation reactor (HDO). Often the combined feed stream (6) may be combined with an amount of a hydrocarbon mixture, which may be recycled product, or added hydrocarbon, such as a fossil feedstock. The deoxygenation reactor operates under deoxygenation conditions, such as 30-150 barg pressure, 250-400 C and gas/oil ratio of 500-2000 Nm3/m3, with a typical conversion of 90-100% of oxygenates to hydrocarbons, water and $CO_2$. From the deoxygenation reactor (HDO) a deoxygenated product stream (8) is withdrawn and directed to a separation section (SEP), which may be a single flash separator, a stripping column, or a train of separators. From the separation section (SEP) at least a liquid stream (11) and a gas stream (12) are withdrawn. Optionally an aqueous (10) and a non-aqueous liquid stream (11) are withdrawn, since water is a significant product of the deoxygenation process. The gas stream (12) is optionally split in a purge gas stream (20) and hydrogen rich gas stream, which is pressurized in a recycle compressor (COMP). An amount of make-up hydrogen (24) is typically added to the hydrogen rich gas stream (22), and a sulfide source (26) is typically added to the feedstock stream comprising oxygenates (2), but the latter may be avoided if the gas recycle is sufficient to concentrate a moderate amount of sulfur in the feed (2).

During a catalyst cycle, an amount of carbon oxides and light hydrocarbons such as methane may build up in the hydrogen rich gas stream (22), and therefore, especially towards end of run purge may be withdrawn, or the amount of purge may be increased.

In a further embodiment, the process layout may include further process elements. This may include a pre-treatment section separating oxygenates from raw biological material, by chemical and or mechanical treatment. It may also include a pre-hydrogenation section, in which selected chemical conversions are carried out under specific conditions, e.g. hydrogenation of olefins at low temperatures. The process layout may also include a hydrocracking and/or an isomerization section, which may involve a sulfided or a reduced catalytically active material. If the catalytically active material is sulfided, the section may typically be placed between the deoxygenation reactor (HDO) and the separation section (SEP), whereas, if it is reduced, it will placed downstream the separation section (SEP), and receive purified hydrogen.

Figure 2:
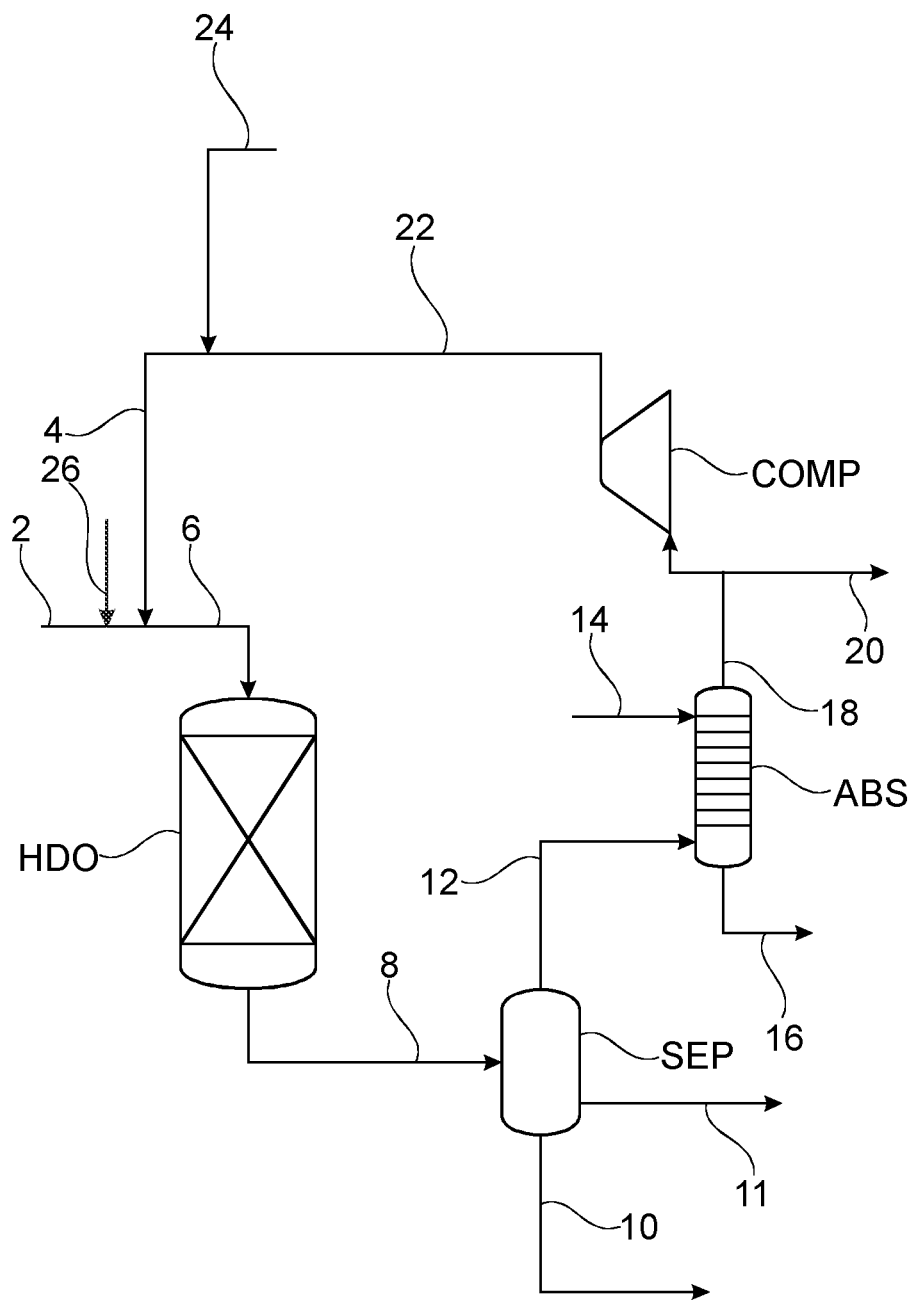
FIG. 2 shows a process layout according to the prior art.

In FIG. 2, a process with recycle of hydrogen and amine absorber in the gas loop is shown. Again, a feedstock stream comprising oxygenates (2) is combined with a hydrogen rich gas stream (4), and directed as a combined feed stream (6) to a deoxygenation reactor (HDO). From the deoxygenation reactor (HDO) a deoxygenated product stream (8) is withdrawn and directed to a separation section (SEP), which may be a single flash separator, a stripping column, or a train of separators. From the separation section (SEP) at least a liquid stream (11) and a gas stream (12) are withdrawn. Optionally an aqueous (10) and a non-aqueous (11) liquid stream are withdrawn. The gas stream (12) is directed to an amine absorber (ABS) or another means of selective separation, withdrawing one or more of CO, $CO_2$ and $H_2S$. If the means of selective separation is an amine absorber, a stream of lean amine solution (14) is directed to the absorber, and a rich amine solution (16), comprising amines and $CO_2$ and $H_2S$ is withdrawn. A purified gas stream (18) is withdrawn from the amine absorber (ABS) and optionally split in a purge gas stream (20) and hydrogen rich gas stream, which is pressurized in a recycle compressor (COMP). An amount of make-up hydrogen (24) is typically added to the hydrogen rich gas stream (22), and a sulfide source (26) is added to the feedstock stream comprising oxygenates (2).

In this layout, carbon dioxide will not build up in the hydrogen rich gas stream (22), but a purge may be required to remove other impurities, including CO, especially towards end of run purge may be withdrawn, or the amount of purge may be increased.

EXAMPLES

Experiments were carried out to evaluate the performance of a hydrogenation process in which CO was present.

Experiment 1 evaluates hydrogenation activity by comparing desulfurization of a pure fossil gasoil with desulfurization of a combined feedstock, comprising 85% gasoil and 15% rapeseed oil, over a catalytically active material, comprising 3.4% cobalt and 15% molybdenum, supported on alumina. The composition of the feedstocks can be seen in Table 1, and the conditions of the experiment in Table 2.

Pure Hydrogen was used as treat-gas in the test. The experiment showed active hydrogenation (desulfurization was 99.0%) for fossil gasoil, but for the combined feedstock under the same conditions, hydrogenation activity was low (desulfurization activity was only 93.6%).

Experiment 2 investigates the reason for the low hydrogenation activity, for the combined feedstock, by varying the concentration of CO, with the experimental conditions of Table 3. The experimental results in Table 4 shows that the hydrogenation activity decreases significantly with the presence of CO, with a sulfur level in the product of 645 $ppm_{wt}$, when 1% CO was present, vs a sulfur level in the product of 167 $ppm_{wt}$, in the absence of CO.

Experiments 1 and 2 confirm the assumption in the field, that recycle of treat gas requires efficient removal of CO, to avoid poisoning of the catalyst.

However, further experiments were carried out, based on the same feedstocks, but a different catalytically active material, comprising 2.9% nickel and 15.5% molybdenum, supported on alumina. Experiment 3 evaluates hydrogenation activity by comparing desulfurization of a pure fossil gasoil with desulfurization of a combined feedstock, comprising gasoil and rapeseed oil, over a nickel/molybdenum catalyst, at the conditions shown in Table 5. Pure Hydrogen was used as treat-gas in the test. The experiment showed active hydrogenation (desulfurization was 99.1%) for fossil gasoil, and surprisingly similar hydrogenation activity (desulfurization was 99.4%) was found for combined feedstock.

Experiment 4 investigates the influence of CO on hydrogenation activity, by varying the concentration of CO. The results of the experiment in Table 6 shows that the hydrogenation activity is only slightly decreased with the presence of CO, with a sulfur level in the product of 434 $ppm_{wt}$, when 1% CO was present, vs. a sulfur level in the product of 300 $ppm_{wt}$, in the absence of CO.

Based on Experiments 1-4 it may be concluded that presence of CO is acceptable for nickel/molybdenum catalyst, and thus that this material is preferred for feedstocks rich in oxygenates and treat gases comprising CO. Considering this robustness, a process with recycle of treat gas may be carried out without requiring highly efficient removal of CO.

An analysis of the investment and operation cost for the process layouts according to FIG. 1 and FIG. 2 shows an approximate 10% investment saving and an approximate 5% operational saving, which naturally is highly relevant.

TABLE 1

|  | Gasoil | Gasoil/Rapeseed oil |
| --- | --- | --- |
| Sulphur, wt % | 1.28 | 1.04 |
| Hydrogen, wt % | 13.1 | 12.9 |
| SG 60/60° F. | 0.8554 | 0.8647 |
| Nitrogen, wtppm | 180 | 169 |
| Aromatics, wt % | 26.96 | 25.89 |
| Mono-aromatics, wt % | 15.36 | 13.25 |
| Di-aromatics, wt % | 9.56 | 8.55 |
| Tri aromatics+, wt % | 2.04 | 4.09 |
| Sim. Dist. D-2887XC | | |
| IBP | 132 | 137 |
| 10 wt %, ° C. | 253 | 254 |
| 30 wt %, ° C. | 286 | 287 |
| 50 wt %, ° C. | 313 | 318 |
| 70 wt %, ° C. | 345 | 356 |
| 90 wt %, ° C. | 388 | 426 |
| FBP wt %, ° C. | 429 | 612 |

TABLE 2

|  | Experiments 1A | Experiments 1B |
| --- | --- | --- |
| Temperature, ° C. | 350 | 350 |
| Pressure, barg | 45 | 45 |
| LHSV, 1/h | 1.5 | 1.5 |
| $H_2$/Oil, Nl/l | 250 | 250 |
| Feedstock | Gasoil | Gasoil/Rapeseed oil |
| Product sulfur (wtppm) | 127 | 696 |
| Desulfurization | 99.0% | 93.6% |

TABLE 3

|  | Experiment 2 and 4 |
| --- | --- |
| Feedstock | Gasoil |
| Pressure, barg | 30 |
| LHSV, 1/h | 1.0 |
| Treat gas composition | 0-1 vol % CO, Balance with H2 |
| Treat gas/Oil, Nl/l | 250 |

TABLE 4

| CO vol % | Product sulfur (wtppm) | Desulfurization |
| --- | --- | --- |
| 0 | 167 | 98.7% |
| 0.1 | 223 | 98.3% |
| 1 | 645 | 95.0% |

TABLE 5

|  | Experiments 3A | Experiments 3B |
| --- | --- | --- |
| Temperature, ° C. | 350 | 350 |
| Pressure, barg | 45 | 45 |
| LHSV, 1/h | 1.5 | 1.5 |
| Treat gas composition | 100 vol % H2 | 100 vol % H2 |
| Treat gas/Oil, Nl/l | 250 | 250 |
| Feedstock | Gasoil | Gasoil/Rapeseed oil |

TABLE 5-continued

|  | Experiments 3A | Experiments 3B |
|---|---|---|
| Product sulfur (ppm) | 75 | 96 |
| Desulfurization | 99.4% | 99.1% |

TABLE 6

| CO vol % | Product sulfur (wtppm) | Desulfurization |
|---|---|---|
| 0 | 300 | 97.7% |
| 0.01 | 326 | 97.5% |
| 0.1 | 346 | 97.3% |
| 1 | 434 | 96.6% |

The invention claimed is:

1. A method for production of a hydrocarbon mixture from a feedstock stream comprising oxygenates and a make-up hydrogen gas stream, comprising the steps of directing a feed stream, comprising the feedstock stream comprising oxygenates, the make-up hydrogen gas stream and a hydrogen rich gas stream, to contact a material catalytically active in deoxygenation under active deoxygenation conditions and withdrawing a deoxygenated product stream and an aqueous stream, wherein the hydrogen rich gas stream comprising at least 70 vol % hydrogen, at least 0.1 vol % carbon oxides and at least 50 ppm$_{vol}$ H$_2$S, wherein the hydrogen rich gas stream comprises a recycled amount of a separated gas stream, wherein 1 to 50 vol % of carbon oxides in the recycled amount of said separated gas stream are removed prior to the hydrogen rich gas stream comprising the recycled amount of said separated gas stream being directed to contact said material catalytically active in deoxygenation without requiring a step of purifying the recycled amount of said separated gas stream by amine wash scrubbing.

2. A method according to claim 1, wherein the hydrogen rich gas stream comprises at least 0.1 vol % carbon dioxide.

3. A method according to claim 1, wherein the hydrogen rich gas stream comprises at least 0.1 vol % carbon monoxide.

4. A method according to claim 1, wherein said feedstock stream comprising oxygenates, comprises a fresh feedstock rich in oxygenates and a diluent, said diluent being a further feedstock or a recycled liquid stream.

5. A method according to claim 4, wherein said liquid diluent comprises less than 0.1 vol % atomic oxygen.

6. A method according to claim 4, wherein said liquid diluent comprises an amount of said deoxygenated product stream or comprises an amount of a product from a process step receiving an amount of said deoxygenated product stream.

7. A method according to claim 4, wherein said liquid diluent is a stream comprising fossil feedstock.

8. A method according to claim 1, wherein the amount of sulfur contained in said hydrogen rich gas stream relative to the amount of sulfur in the gas phase of the combined feed stream is at least 40%.

9. A method according to claim 1, wherein said material catalytically active in deoxygenation comprises molybdenum and/or nickel, on a support of refractory material and comprises less than 0.1 vol % cobalt.

10. A method according to claim 1, further comprising directing at least an amount of said deoxygenated product stream to contact a material catalytically active in hydrocracking and/or hydroisomerization under active hydrocracking and/or hydroisomerization conditions and withdrawing a further treated product stream.

11. A method according to claim 10, wherein said deoxygenated product stream or said further treated product stream is separated into the separated gas stream and a liquid stream.

12. A method according to claim 1, wherein said carbon oxides are removed from the separated gas stream by a process involving membrane separation or by withdrawal of a purge gas stream.

13. A method according to claim 1, wherein said removal of carbon oxides does not involve scrubbing of the separated gas stream.

* * * * *